No. 673,682. Patented May 7, 1901.
W. W. HUMPHREYS.
PNEUMATIC SPRING FOR VEHICLES.
(Application filed Jan. 22, 1901.)
(No Model.)

WITNESSES:
Edward Thorpe
Wm. P. Patton

INVENTOR
William W. Humphreys
BY
ATTORNEYS ated parts, as is here-
UNITED STATES PATENT OFFICE.

WILLIAM W. HUMPHREYS, OF SHEFFIELD, ILLINOIS.

PNEUMATIC SPRING FOR VEHICLES.

SPECIFICATION forming part of Letters Patent No. 673,682, dated May 7, 1901.

Application filed January 22, 1901. Serial No. 44,297. (No model.)

*To all whom it may concern:*

Be it known that I, WILLIAM W. HUMPHREYS, a citizen of the United States, and a resident of Sheffield, in the county of Bureau and State of Illinois, have invented a new and Improved Pneumatic Spring for Vehicles, of which the following is a full, clear, and exact description.

This invention has for one object to provide novel, simple, and effective pneumatic springs in cushion form which are supported upon the running-gears of a vehicle and in turn support the vehicle-body, such springs being adapted to absorb the shocks of percussion sustained by the vehicle while passing over a road-bed.

A further object is to provide elastic cushions of elongated form adapted for inflation and applicable to the running-gears of a vehicle for support of the body thereon, such spring appliances serving to absorb shocks incidental to the traverse of the vehicle over a road-bed and taking the place of pneumatic tires.

The invention consists in the novel construction and combination of parts, as is hereinafter described, and pointed out in the claims.

Reference is to be had to the accompanying drawings, forming a part of this specification, in which similar characters of reference indicate corresponding parts in all the views.

Figure 1:
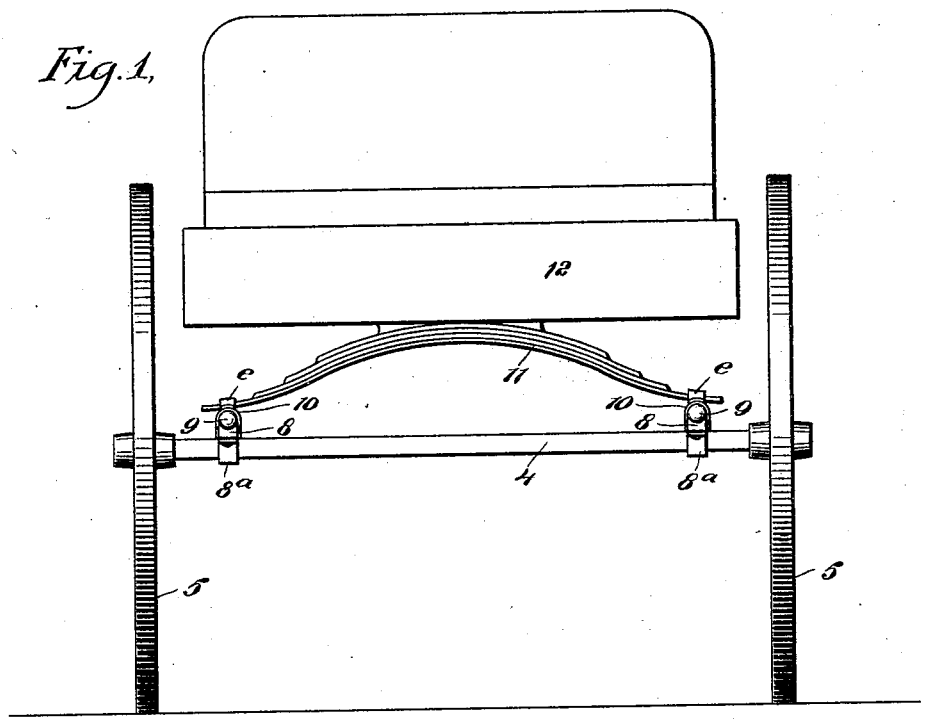
Figure 2:
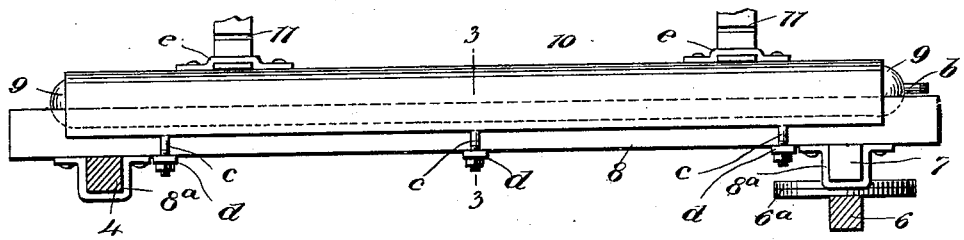
Figure 3:
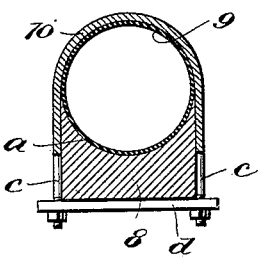

Figure 1 is a rear end view of a vehicle and the improvement applied thereon. Fig. 2 is an enlarged and partly-sectional side view of the running-gear of a vehicle, showing the invention in place thereon; and Fig. 3 is an enlarged transverse sectional view of details of the improvement, substantially on the line 3 3 in Fig. 2.

In the drawings, 4 represents the rear axle of a four-wheeled vehicle; 5, the supporting-wheels thereon; 6, the front axle; 6ª, a fifth-wheel device mounted upon the front axle, and 7 a transversely-disposed bolster-bar held to swing with the upper portion of the fifth-wheel device, as usual.

The details of construction which have been briefly mentioned may have any preferred form and proportions adapted to conform with the style of vehicle upon which the improvement is applied.

Upon the rear axle 4 and the bolster 7 two similar reach-bars 8 are secured by appropriate ends thereof, said reach-bars being held in place by clip-bands 8ª, which respectively engage said reach-bars and the rear axle as well as the bolster-bar.

Each reach-bar 8 is longitudinally channeled upon its upper side, and preferably concave in cross-section, as clearly shown for one reach-bar in Fig. 3.

In the channel $a$ of each reach-bar 8 an elongated tubular cushion 9 is seated, said cushions being formed of gum fabric of approved strength and suitable dimensions, which adapts each of these similar cylindrical hollow cushions to extend within the channels $a$ nearly the length of the reach-bar it engages.

One end of each elastic cushion 9 is hermetically sealed, and in the opposite end thereof a valve $b$ of any preferred construction is secured, these valves being provided to permit the inflation of the cushions with atmospheric air and the subsequent sealing of the same by a closed adjustment of the valves.

Upon each reach-bar 8 and cushion 9 a saddle-plate 10 is mounted, each saddle-plate having an inverted-U shape in cross-section, as shown in Fig. 3, the opposite depending sides of each saddle-plate 10, that are parallel with each other, being separated sufficiently to adapt them to loosely embrace the sides of the reach-bar upon which they are mounted.

A suitable number of bolts $c$ are formed on or secured to the side edges of each saddle-plate 10, so as to depend therefrom at spaced intervals, these bolts being opposite in pairs, and upon each pair of bolts a clamping-plate $d$ is placed, the bolts passing through perforations in the plates and receiving nuts on their projecting ends.

It will be seen that the saddle-plates 10 will be elastically sustained in position by the inflated cushions 9 and be prevented from accidental displacement by the clamping-plates $d$, which extend across below the reach-bars, as clearly shown in Figs. 2 and 3.

On the saddle-plates 10, at appropriate points, the ends of the vehicle-springs 11 are held secured by clip-plates $e$ or equivalent means, said springs, which are of the usual elliptic form, supporting the vehicle-body 12 in the usual manner.

In service the traverse of the vehicle-wheels 5 over a road-bed will transmit the shocks sustained by them to the vehicle-axles and reach-bars 8, the elasticity of the pneumatic cushions 9, which engage the reach-bars, obviously absorbing the successive jolts communicated to the axles and reach-bars, so that the springs 11 will by their coaction give to the vehicle-body a gentle rocking motion without being affected by the roughness of the road over which the vehicle passes.

It is to be understood that I do not limit the application of the improvement solely to the style of vehicle shown in the drawings, as it is evident that automobiles and two-wheeled vehicles may be provided with the pneumatic-cushion springs herein shown and described and that said spring-cushions will effectively absorb shocks of percussion sustained by the vehicle.

Having described my invention, I claim as new and desire to secure by Letters Patent—

1. The combination with two vehicle-axles, and two spaced parallel reach-bars extended between the axles, of two elongated pneumatic-cushion springs respectively held upon the reach-bars, and adapted to support a vehicle-body.

2. The combination with the two axles and body of a vehicle, of two elongated inflatable-cushion springs, two spaced reach-bars extended between the axles and supporting the cushion-springs, and saddle-plates carried by the cushion-springs for support of the vehicle-body.

3. The combination with the two axles and body of a vehicle, of two elongated inflatable-cushion springs, two spaced reach-bars extended between the axles and supporting the cushion-springs, two saddle-plates seated upon the cushion-springs, and clamping devices adapted to secure the saddle-plates upon the reach-bars.

4. The combination with a vehicle running-gear, of elongated inflatable cushions mounted thereon, a saddle-plate carried by each of said cushions, and elliptical springs supported by the saddle-plates.

5. The combination with two axles, a bolster-bar on one of said axles, and a fifth-wheel device between the bolster and axle, of two reach-bars mounted upon one of said axles and the bolster-bar, each reach-bar having its upper side channeled, a pneumatic tubular cushion carried in the channel of each of the reach-bars, and a U-shaped saddle-plate mounted loosely upon each pneumatic cushion.

In testimony whereof I have signed my name to this specification in the presence of two subscribing witnesses.

WILLIAM W. HUMPHREYS.

Witnesses:
GEORGE W. BOYDEN,
CHARLES W. BOYDEN.